United States Patent [19]
Sengoku et al.

[11] Patent Number: 4,874,630
[45] Date of Patent: Oct. 17, 1989

[54] PROCESS FOR PRODUCING RETORT BEAN CURDS

[75] Inventors: Koji Sengoku; Yoshiaki Nagatome, both of Osaka, Japan

[73] Assignee: House Food Industries, Co., Osaka, Japan

[21] Appl. No.: 333,814

[22] Filed: Apr. 6, 1989

Related U.S. Application Data

[63] Continuation of Ser. No. 925,942, Nov. 3, 1986, abandoned.

[30] Foreign Application Priority Data

Apr. 30, 1986 [JP] Japan ................................. 61-97897

[51] Int. Cl.[4] ................................................ A23L 1/20

[52] U.S. Cl. .................................... 426/634; 426/573; 426/656

[58] Field of Search ............... 426/609, 611, 634, 656, 426/573

[56] References Cited

U.S. PATENT DOCUMENTS

| | | | |
|---|---|---|---|
| 3,865,956 | 2/1975 | Fukushima et al. | 426/634 |
| 3,896,975 | 7/1975 | Follmer | 222/192 |
| 4,137,339 | 1/1979 | Kudo et al. | 426/634 |

FOREIGN PATENT DOCUMENTS

| | | | |
|---|---|---|---|
| 52-21066 | 8/1977 | Japan . | |
| 53-115844 | 10/1978 | Japan | 426/634 |
| 54-002399 | 1/1979 | Japan | 426/634 |
| 58-089156 | 5/1983 | Japan | 426/634 |
| 59-179047 | 10/1984 | Japan | 426/634 |

*Primary Examiner*—Barry S Richman
*Assistant Examiner*—Timothy M. McMahon
*Attorney, Agent, or Firm*—Armstrong, Nikaido, Marmelstein, Kubovcik & Murray

[57] ABSTRACT

There is provided a process for producing retort bean curds. An aqueous solution of soybean milk or soybean protein extract is added thereto calcium sulfate or magnesium chloride, an aqueous solution of polyoxyethylene sorbitan fatty acid ester of above HLB-14 and an aqueous solution of cane sugar fatty acid ester, the resulting mixture is placed into a heat-resisting synthetic resin mold container and the content of the container is subjected to retort treatment.

5 Claims, No Drawings

PROCESS FOR PRODUCING RETORT BEAN CURDS

This application is a continuation of application Ser. No. 925,942, filed Nov. 3, 1986, now abandoned.

BACKGROUND OF THE INVENTION

This application is a continuation of application Serial No. 925,942 filed November 3, 1986 now abandoned.

This invention relates to a process for producing retort bean curds and more particularly, to a process for producing retorn bean curds which can be easily released from their mold containers after the bean curds have been solidified therein.

Of late, retort bean curds which can be preserved for a fairly long period of time even at environmental temperatures have been developed. In order to further develop retort bean curds of the type, the inventors have produced retorn bean curds on an experimental basis in which (1) calcium salt represented by calcium sulfate or magnesium salt represented by magnesium chloride is employed as a solidification agent for solidifying soybean milk and (2) the soybean milk containing the solidification agent is simultaneously solidified and sterilized by retort treatment so that retort bean curds having excellent sense of eating and savour can be obtained.

In the experimental production of retort bean curds, the inventors have encountered the problem that the obtained retort bean curds are not easily released from their mold containers and thus, when released from the mold containers, the retort bean curds are get out of shape and present considerably disfigured appearance.

In order to solve the problem, the inventors have applied the technology as disclosed in Japanese Patent No. 891,248 in an attempt to obtain retort bean curds which can be easily released from their mold containers. According to the technology of the Japanese patent, surfactants of above HLB-11 (Hydrophile Lipophile Balance) are added to soybean milk. However, although the above-mentioned problem can be solved by the technology of the Japanese patent, it has been now found that for the purpose, the technology presents the new problem that surfactants of above HLB-11 have to be employed in substantial amounts and as a result, the obtained retort bean curds have poor sense of eating and savour.

Thus, after strenous research, the inventors have now found that when polyoxyethylene sorbitan fatty acid ester of above HLB-14 and cane sugar fatty acid ester of above HLB-11 in specific amounts are added to soybean milk, the above-mentioned new problem can be effectively solved to thereby enable to obtain retort bean curds which can be easily released from mold containers.

SUMMARY OF THE INVENTION

The present invention has been developed on the basis of the finding and provides a process of the type for producing retort bean curds by adding calcium salt or magnesium salt to soybean milk or an aqueous solution of soybean protein extract, placing the mixture into a heat resisting synthetic resin mold container and subjecting the content of the container to retort treatment. In one preferred embodiment of the present invention, furthermore, 0.01~0.032% by weight of polyoxyethylene sorbitan fatty acid ester of above HLB-14 and 0.01~0.1% by weight of cane sugar fatty acid ester of above HLB-11 in specific amounts are added to the soybean milk mixture or the aqueous solution of the soybean protein extract mixture based on the weight of the mixture, respectively, and when the amount of the polyoxyethylene sorbitan fatty acid ester is assumed as A % by weight based on the weight of soybean milk or aqueous solution of soybean protein extract and the amount of the cane sugar fatty acid ester is assumed as B % by weight based on the weight of soybean milk or aqueous solution of soybean protein extract, respectively, the two esters are so added to the mixture that the sum of the amounts of the two esters satisfies the formula $0.18 \geqq A \times 2.5 + B \geqq 0.09$.

According to one aspect of the present invention, there is provided a process for producing retort bean curds wherein a solidification agent in a suitable amount is added to soybean milk or an aqueous solution of soybean protein extract, the resulting mixture is placed into a heat-resisting synthetic resin mold container and the content of said mold container is subjected to retort treatment, characterized in that said soybean milk or aqueous solution of soybean protein extract is further added thereto polyoxyethylene sorbitan fatty acid ester of above HLB-14 and cane sugar fatty acid ester of above HLB-11 together with said solidification agent, assuming that the amount of said first mold release agent is A% by weight based on the weight of soybean milk or aqueous solution of soybean protein extract said cane sugar fatty acid ester is B, the polyoxyethylene sorbitan fatty acid ester and cane sugar fatty acid ester are added to said soybean milk or aqueous solution of soybean protein extract so that the sum of the amounts of the polyoxyethylene sorbitan fatty acid ester and cane sugar fatty acid ester satisfies the formula $0.18\ A \times 2.5 + B \geqq 0.09$.

PREFERRED EMBODIMENTS OF THE INVENTION

The present invention will be now described in detail hereinbelow.

In the process according to the present invention, soybean milk or an aqueous solution of soybean protein extract is employed as the principal material of bean curd. The soybean milk is one prepared by the conventional process. For example, whole soybeans, peeled soybeans or de-fatted soybeans as the raw material are immersed in water or ground while adding water to the soybeans without being immersed in water to obtain crude soybean milk, the crude soybean milk is subjected to centrifugal separation treatment and heated at a temperature above about 80° C. and preferably at a temperature in the range of 80°~100° C. for about 30 seconds ~10 minutes prior to or after centrifugal separation to thereby obtain complete soybean milk. And the thus obtained soybean milk may be powdered by spray drying or the like. In such a case, the powdered soybean milk is dissolved and dispersed in water or hot water and then employed in the production of bean curd as the principal material. The aqueous solution of soybean protein extract is prepared by adding sulfuric acid, hydrochloric acid, phosphoric acid or acetic acid to soybean milk obtained by any conventional process to precipitate the soybean milk in the acid, drying the precipitate and then dispersing and dissolving the precipitate in water. In this case, the content of the soybean protein extract in the aqueous solution usually substantially corresponds to the content of protein in the conventional soybean milk.

In order to solidify the soybean milk or the aqueous solution of soybean protein extract (the soybean milk and the aqueous solution of soybean protein extract will be generally referred to as "soybean milk" hereinbelow), and in the present invention, a solidification agent such as calcium salt represented by calcium sulfate or magnesium salt represented by magnesium chloride is employed. The use of the solidification agent is to impart excellent sense of eating and savour to the obtained bean curd. The solidification agent is employed in an amount just sufficient to solidify bean curd to a desired hardness suitable for eating and the amount of the solidification agent is generally within the range of 0.1 to 0.5% by weight based on the weight of the soybean milk.

Surfactants as mold release agents useful in the present invention should be polyoxyethylene sorbitan fatty acid ester of above HLB-14 and cane sugar fatty acid ester of above HLB-11. When any one of these surfactants fail to satisfy the value requirement of HLB referred to above, even if the surfactants are employed in specific amounts which will be described hereinbelow, the objects of the present invention can not be attained. It is important that the surfactants are employed in combination in the specified amounts, respectively. When either one of these surfactants is solely employed, the surfactant should be employed in a relatively large amount and as a result, retort bean curd to be obtained would have a substantially low quality. Although the higher the HLB value of plyoxyethylene sorbitan fatty acid ester is, the more satisfactory the result is, the maximum HLB value of such ester available at present is on the order of 17. Similarly, the higher the HLB value of cane sugar fatty acid ester is, the more satisfactory the result is, but the maximum HLB value of such ester available at present is on the order of 19.

In order to attain the objects of the present invention, it is important that polyoxyethylene sorbitan fatty acid ester and cane sugar fatty acid ester are added in specific amounts to soybean milk, respectively, that is, the former is in an amount within the range 0.01~0.032% by weight and the latter in an amount within the range of 0.01~0.1% by weight, respectively, based on the weight of the soybean milk. More particularly, when the amount of the former is assumed as A% by weight based on the weight of soybean milk or aqueous solution of soybean protein extract and the amount of the latter is assumed as B % by weight based on the weight of soybean milk or aqueous solution of soybean protein extract, respectively, the two types of surfactants should be added to the soybean milk to satisfy the formula $0.18 \geqq A \times 2.5 + B \geqq 0.09$.

When the amount of cane sugar fatty acid ester is less than 0.01% by weight based on the weight of the soybean milk, the amount of polyoxyethylene sorbitan fatty acid ester to be added to the soybean milk should be accordingly increased beyond the upper limit of the range referred to above and a result, the amount of polyoxyethylene sorbitan fatty acid ester to be added to the soybean milk exceeds 0.032% by weight based on the weight of the soybean milk and the obtained retort bean curd would exhibit a quite bitter taste. On the other hand, when the amount of polyoxyethylene sorbitan fatty acid ester to be added to the soybean milk is less than 0.01% by weight based on the weight of the soybean milk, the amount of cane sugar fatty acid ester should be increased beyond the upper limit of the range referred to above and as a result, the surface of the obtained retort bean curd would present dried-up appearance. However, even when the amounts of cane sugar fatty acid ester and polyoxyethylene sorbitan are within the above-mentioned ranges, if the sum of the amounts of the two types of surfactants fails to satisfy the formula $0.18 \geqq A \times 2.5 + B \geqq 0.09$, the aspect of the mold release property of the obtained retort bean curd is unsatisfactory.

After soybean milk has been added thereto polyoxyethylene sorbitan fatty acid ester of above HLB-14 and cane sugar fatty acid ester of above HLB-11 as the mold release agents, calcium salt such as magnesium salt as the solidification agent is added to the mixture and the resulting mixture is then placed into a heat-resisting synthetic resin mold container and sealed therein. The mold container may be formed of any suitable synthetic resin which can stand retort treatment such as nylon, polyester, polyethylene, polypropylene or vinylidene chloride, for example, but from the view point of heat transmitting at the retort treatment step, the mold container preferably has a depth lower than 4 cm.

The retort treatment can be performed by any one of the conventional practices such as hot water and steam systems, for example. Retort conditions also may be optionally selected provided that they can provide sterilization environments which can preserve retort bean curds at environmental temperature. Typical conditions are 105°~130° C. and 20~100 minutes.

In this way, retort bean curds which can be easily released from their mold containers are obtainable.

The present invention will now be described by way of the following specific examples which illustrate the present invention, but not limit the invention thereto.

EXAMPLE 1

5 kg of whole soybeans were immersed in water for 16 hours to obtain about 11.2 kg of soaked soybeans and the soaked soybeans were ground while adding water thereto to obtain crude soybean milk. The thus obtained crude soybean milk was boiled for 3~4 minutes. The boiled crude soybeans milk was subjected to centrifugal separation to obtain about 20 liters of soybean milk (the content of solid soybeans was 11% by weight based on the weight of the soybean milk) and the soybean milk was cooled to 10° C. A portion was taken out of the thus cooled soybean milk and divided into four samples each containing 285 ml. These samples were added thereto (A) 1.92 ml of an aqueous solution of polyoxyethylene sorbitan fatty acid ester having the values of HLB as shown in Table 1 (5% by weight of the weight of water), (B) 1.5 ml of an aqueous solution of cane sugar fatty acid ester having the values of HLB as shown in Table 1 (2% by weight based on the weight of the milk), respectively and 7.5 ml of an aqueous solution of calcium sulfate (10% by weight based on the weight of water), respectively. The resulting mixture was added water thereto in an amount to obtain 300 ml of soybean milk. In the thus obtained soybean milk, based on the weight of the milk, the amount of the polyoxyethylene sorbitan fatty acid ester was 0.032% by weight and that of the cane sugar fatty acid ester was 0.01% by weight, respectively. And the value of formula $A \times 2.5 + B$ was 0.09. The soybean milk was placed into a polypropylene mold container of 300 ml capacity and sealed therein. The content of the mold container was subjected to retort treatment at 121° C. for 35 minutes.

The thus obtained retort bean curd products were tested for unmolding property and sense of eating and savour by test panel.

The test panels are shown in Table 1. The mold release property test was conducted by opening the polypropylene mold container, shaking the opened mold container laterally two or three times and turning the container upside down to determine whether the bean curd was easily discharged out of the container or not.

As is clear from Table 1, it has been now found that even if the value of HLB of polyoxyethylene sorbitan fatty acid ester is above 14, when the value of HLB of cane sugar fatty acid ester is less than 11, the unmolding property of the bean curd is unsatisfactory (Sample 1). On the other hand, when the value of HLB of cane sugar fatty acid ester was above 11, the unmolding property was satisfactory and furthermore, as HLB values of the two types surfactants became higher, the unmolding property was improved accordingly (Samples 2∼4).

TABLE 1

| Sample No. | A | B | Unmolding property |
|---|---|---|---|
| 1 | 14.9 | 10 | Δ |
| 2 | 14.9 | 11 | ○ |
| 3 | 16 | 11 | ○ |
| 4 | 16 | 14 | **O** |

Remarks:
A: HLB value of polyoxyethylene sorbitan fatty acid ester
B: HLB value of cane sugar fatty acid ester
Unmolding property:
O Quite good
○ Good
Δ Moderately poor

EXAMPLE 2

A portion was taken out of about 20 liters of soybean milk obtained in the same procedure as that described in connected with Example 1 (the solid soybean content was 11.5% by weight based on the weight of the milk) and divided into twelve samples each containing 270 ml. Except for two samples, the samples were added thereto 5% by weight of an aqueous solution of polyoxyethylene sorbitan fatty acid ester of HLB-15 based on the weight of the milk and 2% by weight of an aqueous solution of cane sugar fatty acid ester of HLB-15 so as to have the samples contain the two types of surfactants in the amounts as shown in Table 2, respectively. Each sample was further added thereto 7.5 g of an aqueous solution of calcium sulfate (10% by weight based on the weight of water) and the resulting mixture was added thereto water to obtain 300 ml of soybean milk. Thereafter, the soybean milk was placed into a polypropylene mold container of 300 ml capacity and sealed therein. The content of the mold container was subjected to retort treatment at 121° C. for 35 minutes.

Each of the thus obtained retort bean curd products was tested for mold release property and sense of eating and savour by test panel. The test results are shown in Table 2.

As is clear from Table 2, when either one only of the two types of surfactants was employed, even when the single surfactant was employed in amounts beyond the upper limit of the its amount range, the objects of the present invention could not be attained (Samples 5 and 6). And even when both the two types of surfactants are employed, if the amounts of the surfactants are beyond the ranges specified by the present invention, the objects of the present invention cannot be attained (Samples 7∼11). On the other hand, when the two types of surfactants were employed in combination in their respective specified amounts, bean curd products which were satisfactory with respect to unmolding property and sense of eating and savour by panel test were obtained to thereby effectively attain the objects of the present invention (Samples 12∼16).

TABLE 2

| Sample No. | A | B | Formula | Unmolding Property | Panel Test |
|---|---|---|---|---|---|
| 5 | 0.035 | — | 0.0875 | Δ | Bitter |
| 6 | — | 0.11 | 0.11 | x | Dry appearance |
| 7 | 0.008 | 0.1 | 0.12 | Δ | Good |
| 8 | 0.032 | 0.008 | 0.088 | Δ | " |
| 9 | 0.035 | 0.11 | 0.1975 | ○ | Bitter and dry appearance |
| 10 | 0.008 | 0.008 | 0.028 | x | Good |
| 11 | 0.02 | 0.035 | 0.085 | Δ | " |
| 12 | 0.032 | 0.01 | 0.09 | ○ | " |
| 13 | 0.02 | 0.04 | " | ○ | " |
| 14 | 0.01 | 0.065 | " | ○ | " |
| 15 | 0.02 | 0.05 | 0.1 | ○ | " |
| 16 | 0.032 | 0.1 | 0.18 | ○ | " |

Remarks:
A: Amount of polyoxyethylene sorbitan fatty acid ester (% by weight based on the weight of soybean milk)
B: Amount of cane sugar fatty acid ester (% by weight based on the weight of soybean milk)
Formula: Value seeked by A × 2.5 + B
Unmolding property: — good, Δ — moderately poor, x — bad

EXAMPLE 3

285 ml of soybean milk (the solid soybean content was 11% by weight based on the weight of soybean milk) was added thereto 1.8 ml of an aqueous solution of polyoxyethylene sorbitan fatty acid ester of HLB-15 (5% by weight based on the weight of water), 3.9 ml of an aqueous solution of cane sugar fatty acid ester (2% by weight based on the weight of water) and 9 ml of an aqueous solution of magnesium chloride (10% by weight based on the weight of water) and the resulting mixture was added water thereto in an amount to provide 300 ml of soybean milk. In the thus obtained soybean milk, based on the weight of the milk, the polyoxyethylene sorbitan fatty acid ester was 0.03% by weight and the can sugar fatty acid ester was 0.026% by weight, respectively. And the value of the formula $A \times 2.5 + B$ was 0.101. Thereafter, the soybean milk was placed into a polypropylene mold container and sealed therein and the content of the container was subjected to retort treatment at 121° C. for 35 minutes. The thus obtained retort soybean curd product exhibited excellent unmolding property and satisfactory sense of eating and savour.

Since bean curds produced by the present invention have been subjected to retort treatment, the bean curds can be preserved for a fairly long period of time and easily released from their mold containers when served for eating and have excellent sense of eating and savour.

The advantages of the present invention, as well as certain changes and modifications of the disclosed embodiments thereof, will be readily apparent to those skilled in the art. It is the applicants' intention to cover by their claims all those changes and modifications which could be made to the embodiments of the invention hereinchosen for the purpose of the disclosure without departing from the spirit and scope of the invention. Protection by Letters Patent of this invention in all its aspects as the same are set forth in the appended claims is sought to the broadest extent that the prior art allows.

What is claimed is:

1. A process for producing retort bean curds wherein an effective amount of a solidification agent to ensure gelling is added to soybean milk or an aqueous solution of soybean protein extract, the resulting mixture is placed into a heat-resisting synthetic resin mold container and the content of said mold container is subjected to retort treatment, comprising, further adding to said soybean milk or aqueous solution of soybean protein extract polyoxyethylene sorbitan fatty acid ester of above HLB-14 and cane sugar fatty acid ester of above HLB-11 together with said solidification agent, and when the amount of said polyoxyethylene sorbitan fatty acid ester is A, and the amount of said cane sugar fatty acid ester is B, in percent by weight based on the weight of said soybean milk or aqueous solution of soybean protein extract, the polyoxyethylene sorbitan fatty acid ester and cane sugar fatty acid ester are added to said soybean milk or aqueous solution of soybean protein extract so that the sum of the amounts satisfies the formula $0.18 > A \times 2.5 + B \geqq 0.09$, and based on the weight of said soybean milk or aqueous solution of soybean protein extract, the amounts of said polyoxyethylene sorbitan fatty acid ester is between about 0.01% to about 0.032% by weight and said cane sugar fatty acid ester is between about 0.01 0.1% by weight.

2. The process as set forth in claim 1, in which said solidification agent is calcium salt or magnesium salt.

3. The process as set forth in claim 2, in which said calcium salt is calcium sulfate and said magnesium salt is magnesium chloride.

4. The process as set forth in claim 1, in which said retort treatment is conducted at 121° C. for 35 minutes.

5. The process as set forth in claim 1, in which said heat-resisting synthetic resin mold container has a height lower than 4 cm.

* * * * *